(12) United States Patent
Baba (10) Patent No.: US 7,413,334 B2
(45) Date of Patent: Aug. 19, 2008

(54) BACKLIGHT AND LIQUID CRYSTAL DISPLAY DEVICE

(75) Inventor: Masatake Baba, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 11/435,132

(22) Filed: May 17, 2006

(65) Prior Publication Data

US 2006/0262564 A1 Nov. 23, 2006

(30) Foreign Application Priority Data

May 17, 2005 (JP) .............................. 2005-144740

(51) Int. Cl.
*F21V 7/04* (2006.01)
(52) U.S. Cl. ...................... 362/616; 362/600; 362/609; 362/617
(58) Field of Classification Search ................. 362/616, 362/612, 613, 26, 27
See application file for complete search history.

(56) References Cited

U.S. PATENT DOCUMENTS 5,128,781 A * 7/1992 Ohno et al. .................... 349/65

6,951,401 B2 * 10/2005 Van Hees et al. ............. 362/612
7,188,988 B2 * 3/2007 Koganezawa ................ 362/616
2003/0210537 A1 * 11/2003 Engelmann ................... 362/26

FOREIGN PATENT DOCUMENTS

JP 2004-158336 6/2004
WO WO 01/840046 4/2001

OTHER PUBLICATIONS

Yourii Martynov et al., "High-Efficiency Slim Led Backlight System With Mixing Light Guide", ISSN/0003-0966X/03/3402-1259 SID 03 Digest, 43.3/Y. Marytynov.

* cited by examiner

*Primary Examiner*—Ali Alavi
*Assistant Examiner*—Evan Dzierzynski
(74) *Attorney, Agent, or Firm*—Young & Thompson

(57) ABSTRACT

A plurality of LEDs are arrayed in a single row between the opposing end faces of a pair of first and second light guide plates that are disposed so that the end faces thereof face each other. A reflective sheet is disposed on the lower surfaces of the pair of first and second light guide plates, and a separation plate is disposed so as to cover the upper surfaces of the first and second light guide plates and the gap therebetween. A reflecting body for guiding light emitted upward from the LEDs to the first and second light guide plates is disposed in the area immediately above the LEDs on the lower surface of the separation plate. A diffusion plate is disposed with a fixed gap above the separation plate, and a hollow area is formed between the diffusion plate and the separation plate.

19 Claims, 6 Drawing Sheets

FIG. 13

BACKLIGHT AND LIQUID CRYSTAL DISPLAY DEVICE

BACKGROUND OF THE INVENTION

1. Field of the Invention

The present invention relates to a backlight which uses a light-emitting diode or the like as a light source and which is used in display devices, and to a liquid crystal display device provided with the backlight.

2. Description of the Related Art

Conventionally, cold cathode fluorescent lamps are principally used as the light source for a backlight of a liquid crystal display device, but a cold cathode fluorescent lamp requires a dedicated lighting circuit that requires the use of high voltage. Therefore, an LED (Light Emitting Diode) is used as a light source in mobile phones, PDAs (Personal Digital Assistant), and other small applications in particular. However, the light emission of the LED is mainly an artificial white light that is obtained by coating a blue LED with a YAG fluorophor, and there are difficulties in color reproducibility, and the reproducibility of red colors in particular. It is impossible to improve this structure if it is treated as a unit, and a separate red LED must therefore be supplemented or an LED must be used that emits a red (R), green (G), or blue (B) monochromatic light. However, not only do LEDs have difficulty with color reproducibility, but also the quantity of light is low, the cost is higher than a cold cathode fluorescent lamp, and there are other problems. Therefore, there are few opportunities to use LEDs in monitors and TV applications.

Figure 1:
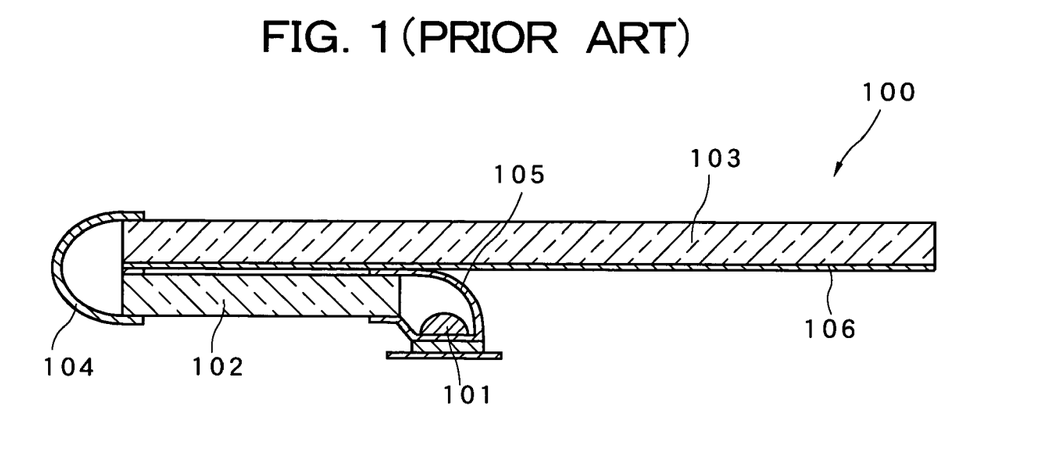
FIG. 1 is a cross-sectional diagram that schematically shows the structure of the conventional backlight of SID 03 DIGEST, 2003, p1259-1261.

On the other hand, LED efficiency has recently continued to improve, LEDs that can accommodate considerable electric currents are being developed, and, with the consideration of environmental issues, work is actively being carried out with the aim of commercializing relatively large backlights in which LEDs are used. Examples of a backlight in which such an LED is used includes one in which LEDs are provided with a plurality of light guide plates and disposed as light sources on the end face of each of the light guide plates (refer to FIG. 1A of Japanese Domestic Re-publication No. 2003-532273), and one in which a plurality of substrates having side-emitting LEDs that are disposed in an array are disposed in a box-shaped reflector, and in which this configuration is used as a surface light source.

FIG. 1 is a cross-sectional diagram schematically showing the structure of the conventional backlight described in SID 03 DIGEST, 2003, p1259-1261. The conventional backlight 100 described in SID 03 DIGEST, 2003, p1259-1261, as shown in FIG. 1, has a configuration in which a plurality of LEDs 101 that emit a red (R), green (G), or blue (B) monochromatic light are aligned in a suitable array. The direction of travel of the light emitted from the LED 101 is changed by roughly 90° at a first reflector 105, and the light enters the light guide plate 102. The monochromatic light of the colors RGB that enters the light guide plate 102 is propagated inside the light guide plate 102 repeatedly undergoing total reflection. In this interval, the colors become mixed and the light is emitted from the opposite side of the plane of incidence. The direction of travel of light emitted from the light guide plate 102 is changed 180° at a second reflector 104, and the light enters a light guide plate 103. The light that is incident to the light guide plate 103 is uniformly emitted from the top surface of the light guide plate 103 through the use of a scattering and reflective pattern disposed on the reverse surface thereof (the surface on the reflective sheet 106 side).

When the white light LEDs described above are used as the light source in such a conventional backlight, emphasis must be placed on making brightness more uniform, and there is little need for concern with regard to nonuniformity of colors, but when monochromatic RGB LEDs are used, it is not an exaggeration to say the value of the device as a backlight is determined by how efficiently the colors of the light emitted from the LEDs can be mixed. In view of the above, in order to prevent brightness and color from being nonuniform, the backlight proposed in Japanese Laid-Open Patent Application No. 2004-158336 is configured with a second reflector 104 composed of polymethyl methacrylate, polycarbonate, or another transparent body whose index of refraction is higher than that of air, and also composed of a reflective plate disposed on the external surface of the transparent body.

However, the prior art described above has the following problems. In the specific case of the backlight 100 shown in FIG. 1, a light guide plate 103 is required to cover the illuminated surface, and a light guide plate 102 is required to mix the colors of RGB monochromatic LED light. Therefore, there is a problem in that the mass of the light guide plate becomes several times greater than an ordinary edge-type backlight in which a cold cathode fluorescent lamp or the like is used and in which the light of tube is caused to directly enter the light guide plate, and the overall weight is increased. The backlight 100 also has a problem in that there are incident and excident planes of the light guide plate 102, the incident plane of the light guide plate 103, and many other interfaces between air and physical objects, causing optical loss to occur at the interfaces and the efficiency of the light to decrease.

The backlight of Japanese Laid-Open Patent Application No. 2004-158336 has the effect of improving brightness nonuniformity and color nonuniformity, but there is a problem in that there are conversely a large number of components and increased external dimensions, particularly thickness.

SUMMARY OF THE INVENTION

An object of the present invention is to provide a thin, lightweight, and highly efficient backlight and liquid crystal display device without any nonuniformity of color and brightness caused by LEDs.

The backlight of the first aspect of the present invention comprises: first and second light guide plates disposed so that the end faces thereof face each other having an interval; a light source disposed between the mutually opposing end faces of said first and second light guide plates; an emitter having a hollow interior and disposed above said first and second light guide plates and said light source; wherein said emitter emits light propagated from said light source through said first light guide plate and light propagated from said light source through said second light guide plate.

The backlight of the second aspect of the present invention comprises: first and second light guide plates disposed so that the end faces thereof face each other having an interval; a light source disposed between the mutually opposing end faces of said first and second light guide plates; a diffusion plate disposed above said first and second light guide plates and said light source with a gap; a hollow area formed between said first and second light guide plates and said diffusion plate; first and second reflectors for introducing light propagated from said light source through said first light guide plate and light propagated from said light source through said second light guide plate to said hollow area, wherein light entered to said hollow area is reflected at the interface between said hollow area and said first and second light guides and is emitted through said diffusion plate.

The backlight of the third aspect of the present invention further comprises: a separation plate disposed so as to cover the upper surface of said first and second light guide plates and the gap between said first and second light guide plates, and optically separates said hollow area and said first and second light guide plates.

In the first to third aspects of the present invention, light guide plates for mixing colors are disposed on both sides of the light source, and nonuniformity of luminescent color and brightness can therefore be eliminated while light is propagated through the light guide plates. The area occupied by the light guide plates can be reduced by positioning the light source in the center area of the backlight, and the backlight can be made thinner and lighter than a conventional backlight since a light guide plate is not disposed between the light guide plates and the diffusion plate that constitute the emitter, and the resulting space is made hollow. There are fewer interfaces in comparison with a conventional backlight, optical loss can be reduced, and light efficiency can be improved.

The backlight may have a first reflecting member that is disposed above the light source and reflects toward the first light guide plate or the second light guide plate light emitted upward from the light source. The light efficiency can thereby be improved, and the amount of light emitted can be increased. The backlight may have a second reflecting member for changing the angle at which the light that has entered the hollow area is incident on the diffusion plate. The light introduced to the hollow interior can thereby be made uniform.

The backlight of the fourth aspect of the present invention comprises: first and second light guide plates disposed so that the end faces thereof face each other having an interval; a light source disposed between the mutually opposing end faces of said first and second light guide plates; a third light guide plate disposed above said first and second light guide plates and said light source; a separation plate disposed between said first and second light guide plates and said third light guide plate to separate optically said first and second light guide plates and said third light guide plate; and first and second reflectors for introducing light propagated from said light source through said first light guide plate and light propagated from said light source through said second light guide plate to said third light guide plate, wherein light entered to said third light guide plate is reflected at the upper surface of said separation plate and is emitted from the surface of said third light guide plate that is on the opposite side from said separation plate.

In this case, a scattering and reflecting member may be provided at the surface of the third light guide plate on the separation plate side. The light that has entered the third light guide plate is reflected at the scattering and reflecting member and is emitted from the surface of the third light guide plate that is on the opposite side from the separation plate.

In the fourth aspect of the present invention, a third light guide plate is disposed above the first and second light guide plates and the light source, and the third light guide plate is disposed in place of the hollow area of the first to third aspects of the present invention. Since such a third light guide plate is provided, the light that has propagated through the first and second light guide plates and has been mixed enters the third light guide plate and leaves from the third light guide plate as a planar light. For this reason, a dispersion plate is not required to be disposed on the excident surface of the backlight as in the first and second aspects. In the present aspect, light from the light source is mixed inside the first and second light guide plates in the same manner as the first to third aspects of the present invention. Nonuniformity of luminescent color and brightness can therefore be eliminated, and the area occupied by the light guide plates can be reduced by positioning the light source in the center area of the backlight.

In the backlight, the light-emitting upper surface can be two-dimensionally curved. In such a case, a first reflecting member is provided that extends parallel to the lengthwise direction (medial axis of the curve) of the light source in correspondence to the light source. With this member, light emitted upward from the light source is reflected toward the first light guide plate or the second light guide plate.

The cross section of the first reflecting member may have an inverted triangular shape. The first reflecting member preferably has a cross section whose center portion projects toward the light source and which slopes from the center portion toward the two side portions. The sloping surfaces form concave surfaces and are two-dimensionally curved so as to be upwardly convex. Light spreads in a radial direction when a light source whose light-emitting upper surface is two-dimensionally curved is used, and when the sloped surfaces of the light-receiving first reflecting member are curved so as to be upwardly convex, light can enter efficiently.

In this case, it is preferable that R/D be 1 to 2, and the thickness T be D−2 mm or greater and D+2 mm or less, where R is the radius of curvature of the sloped surface of the first reflecting member, D is the diameter of a lens provided to the curved surface of the upper surface of the light source, and T is the thickness of the first and second light guide plates.

The light source is a light-emitting diode, for example. The light source may have a first light source for emitting red light, a second light source for emitting green light, and a third light source for emitting blue light. The backlight for a small display device can thereby be obtained.

The liquid crystal display device of the fifth aspect of the present invention comprises a liquid crystal panel and a backlight that is disposed behind the liquid crystal and supplies light to the liquid crystal panel, wherein the backlight is the backlight of the first through fourth aspect of the present invention described above.

Since the backlight described above is used in the present invention, a high-quality image can be displayed because there is no nonuniformity of brightness and color, and uniform light can be supplied to a liquid crystal panel.

In accordance with the present invention, first and second light guide plates for mixing colors are disposed on both sides of a light source. Therefore, a thinner, more lightweight backlight with high light efficiency can be obtained without nonuniformity of luminescent color and brightness, and a backlight with higher light efficiency can be obtained.

BRIEF DESCRIPTION OF THE DRAWINGS

FIG. 9 is a view showing the operation of the backlight of the present sixth embodiment.

DESCRIPTION OF THE PREFERRED EMBODIMENTS

Figure 2:
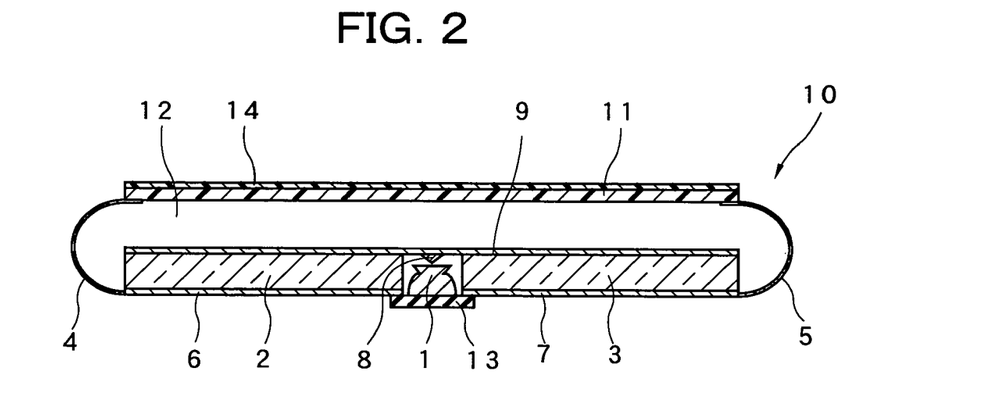
FIG. 2 is a cross-sectional diagram showing the structure of the backlight of the first embodiment of the present invention.

The embodiments of the present invention are described in detail below with reference to the attached diagrams. Described first is the backlight of the first embodiment of the present invention. FIG. 2 is a cross-sectional diagram showing the structure of the backlight of the present embodiment. The backlight 10 of the present embodiment is configured with a plurality of LEDs 1 for emitting red (R), green (G), and blue (B) monochromatic light that are arrayed in a single row as a light source in the center area of the backlight, as shown in FIG. 2. A plurality of first and second light guide plates 2 and 3 are disposed on both sides of the LED 1. More specifically, the LED 1 is disposed between the end faces of the opposing first and second light guide plates 2 and 3 positioned so that their end faces are mutually opposing.

First and second reflecting sheets 6 and 7 are disposed on the lower surface of the first and second light guide plates 2 and 3, and a separation plate 9 is disposed so as to cover the area above the LEDs 1, that is to say, the upper surfaces of the first and second light guide plates 2 and 3 and the gap between the first and second light guide plates 2 and 3. A reflecting body 8 whose cross section is substantially triangular, for example, and whereby light emitted upward from the LED 1 is reflected toward the first light guide plate 2 or second light guide plate 3 is disposed in the area directly above the LEDs 1 on lower surface of the separation plate 9. A diffusion plate 11 is disposed with a fixed interval open above the separation plate 9, and space between the diffusion plate 11 and separation plate 9 is a hollow area 12. First and second reflectors 4 and 5 acting as introduction members for changing the direction of travel of light emitted from the first and second light guide plates 2 and 3 by 180° and bringing the light into the hollow area are disposed on the end-face sides of the first and second light guide plates 2 and 3 that are opposite from the LED 1.

One or a plurality of LEDs 1 are mounted on a substrate 13 in the backlight 10 of the present embodiment, and the LEDs are side-emitting LEDs that exhibit maximum emission intensity in the direction substantially parallel to the surface of the substrate 13. An example of LEDs that may be used is Luxeon Side Emitter manufactured by Lumileds. However, light is emitted upward even when the LEDs 1 are a side light-emitting diode. Therefore, in the backlight 10 of the present embodiment, a reflecting body 8 for directing light emitted upward to the first light guide plate 2 or the second light guide plate 3 is disposed in the area directly above the LEDs 1. The surface of the reflecting body 8 preferably has very low optical loss, such as a mirror surface.

The first and second light guide plates 2 and 3 in the backlight 10 of the present embodiment are required only to propagate light. Therefore, there is no need to provide a scattering and diffusion pattern to the surface as there is in the case of light guide plates that are used in conventional backlights. The first and second reflectors 4 and 5 in the backlight 10 of the present embodiment can have the shape of a semicircular pillar. In such a case, the inside diameter of the first and second reflectors 4 and 5 is preferably equal to or greater than the thickness between the lower surface of the first and second light guide plates 2 and 3 and the upper surface of the separation plate 9, that is to say, equal to or greater than the sum of the thickness of the reflective sheet, the light guide plates, and the separation plate.

The hollow area 12 in the backlight 10 is optically separated from the first and second light guide plates 2 and 3 by the separation plate 9. This area forms an air layer substantially devoid of structural objects other than walls and support columns for forming a hollow area 12.

The separation plate 9 in the backlight 10 of the present embodiment optically separates the hollow area 12 and the first and second light guide plates 2 and 3, as described above. The surface facing the first light guide plate 2 and the second light guide plate 3 therefore preferably has a regular reflection that has little optical loss in the same fashion as a mirror surface or the like. The surface of the separation plate 9 that faces the hollow area 12 causes light that is emitted from the LED 1 and has entered by way of the first light guide plate 2 and the first reflector 4, or by way of the second light guide plate 3 and the second reflector 5, to be directed to the center portion of the separation plate 9 and has a function for reflecting light onto the diffusion plate 11. More specifically, the surface of the separation plate 9 that faces the hollow area 12 can be made into a member in which white light or the like is scattered and reflected in the center portion, for example, and the portion facing the first and second reflectors 4 and 5 can be made into a mirror surface.

In the backlight 10 of the present embodiment, a diffusion sheet and a lens (prism) sheet or another optical sheet 14 can be laminated as required on the upper surface of the diffusion plate 11.

Figure 3:
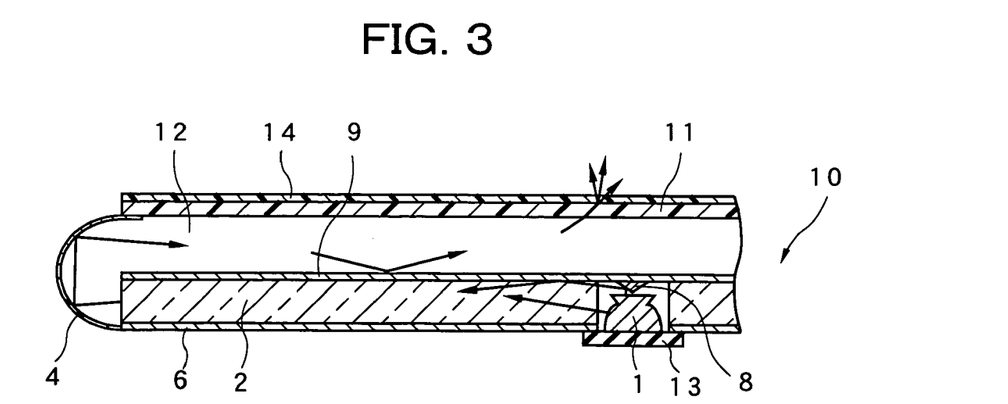
FIG. 3 is a diagram showing the operation of the backlight of the first embodiment of the present invention.

Described next is the operation of the backlight 10 configured as described above. FIG. 3 is a diagram showing the operation of the backlight 10 of the present embodiment. In the backlight 10 of the present embodiment, RGB monochromatic light emitted from the LEDs 1 and incident to the first light guide plate 2 travels toward the light departure surface of the first light guide plate 2, that is to say, the end face that faces the first reflector 4, while repeatedly undergoing total reflection in the interior of the first light guide plate 2, as shown in FIG. 3. The RGB monochromatic light is sufficiently mixed in the process. Light emitted from the first light guide plate 2 is thereafter reflected by the first reflector 4, the optical path of the light is changed 180°, and the light is directed to the hollow area 12 formed between the separation plate 9 and diffusion plate 11. The light directed into the hollow area 12 is scattered by the diffusion plate 11 and is emitted to the exterior by way of the optical sheet 14. In the same fashion, light emitted toward the second light guide plate 3 is also mixed in the interior of the second light guide plate 3, directed to the hollow area 12, scattered by the diffusion plate 11, and emitted to the exterior by way of the optical sheet 14.

In the backlight 10 of the present embodiment, RGB monochromatic light emitted from the LEDs 1 is mixed as it is propagated through the interior of the first and second light guide plates 2 and 3, and the colors are adequately mixed at the point at which the light leaves the first and second light guide plates 2 and 3. Therefore, nonuniformity of the luminescent colors and brightness of the LEDs 1 can be easily eliminated.

In the backlight 10 of the present embodiment, the LEDs 1 are disposed between the first light guide plate 2 and the second light guide plate 3 to reduce the area occupied by the first and second light guide plates 2 and 3 in the backlight 10, and the light guide and scattering portion formed between the separation plate 9 and diffusion plate 11 act as the hollow area 12. Therefore, the backlight can be made lighter and thinner than a backlight in which a light guide plate is provided as a light guide and scattering unit.

The first and second light guide plates 2 and 3 in the backlight 10 of the present embodiment only mix colors of the light emitted from the LEDs 1. Therefore, as long as light can repeatedly undergo total reflection inside the plates, there is no need to provide a scattering and diffusion pattern as there is in the case of the light guide plate of a conventional backlight. For this reason, there is no need for a step in which dots are formed by printing or forming uneven shapes as a scattering and diffusion pattern on the light guide plates with the aid of a stamper. Therefore, costs can be reduced by an amount equal to the cost of the step.

In the backlight 10 of the first embodiment described above, a side surface light-emitting LED is used as a light source, but the present invention is not limited thereby, and an LED having an upward light-emitting peak may be used. In this case, light emitted upward from the LED is reflected by the reflecting body 8 and is incident to the first and second light guide plates 2 and 3. The LEDs 1 are not limited to those that emit RGB monochromatic light, and a white LED can also be used. In such as case, a backlight can be realized in which nonuniformity of brightness and color caused by a white LED is suppressed, in the same manner as in the case in which LEDs with RGB monochromatic light are used. Furthermore, the light source may be one that is not an LED, and as long as the light source is one that has maximum light emission intensity to the side, any light source may be used.

Figure 4:
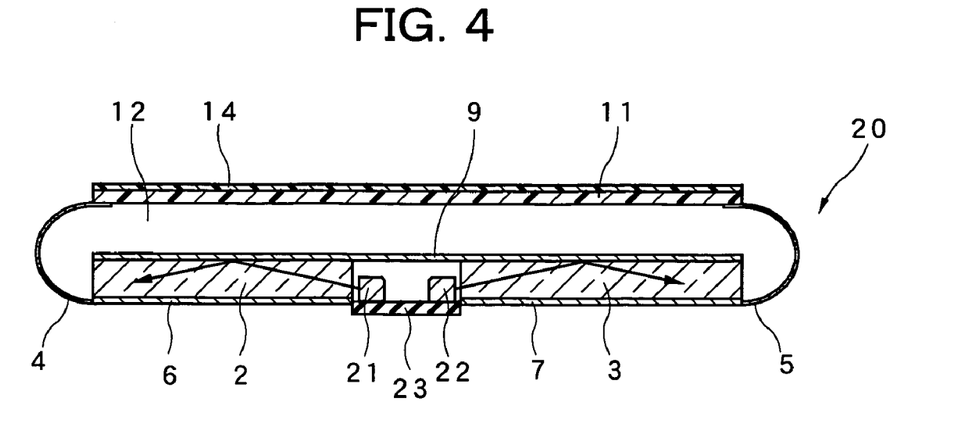
FIG. 4 is a cross-sectional diagram showing the structure of the backlight of the second embodiment of the present invention.

Described next is the backlight of the second embodiment of the present invention. FIG. 4 is a cross-sectional diagram showing the structure of the backlight of the present embodiment. In FIG. 4, the same reference numerals are assigned to the same constituent elements as those of the backlight 10 of the first embodiment shown in FIG. 2, and a detailed description thereof is omitted. In the backlight 20 of the present embodiment, side-view LEDs 21 and 22 that emit light in the horizontal direction are used in place of the side-emitting LEDs, as shown in FIG. 4. Light emitted from the LEDs can thereby be made directly incident to the first and second light guide plates 2 and 3 without the use of a reflective body.

In the backlight 20 of the present embodiment, LEDs are disposed in a plurality of rows. More specifically, a plurality of LEDs 21 corresponding to the first light guide plate 2, and a plurality of LEDs 22 corresponding to the second light guide plate 3 are each mounted in single rows on a substrate 23. The light emitted from the LEDs 21 enters the first light guide plate 2, and the light emitted from the LEDs 22 enters the second light guide plate 3. Higher intensity lighting can thereby be made possible. The configuration, operation, and effects other than those described above in the backlight 20 of the present embodiment are the same as those of the backlight 10 of the first embodiment described above.

Figure 5:
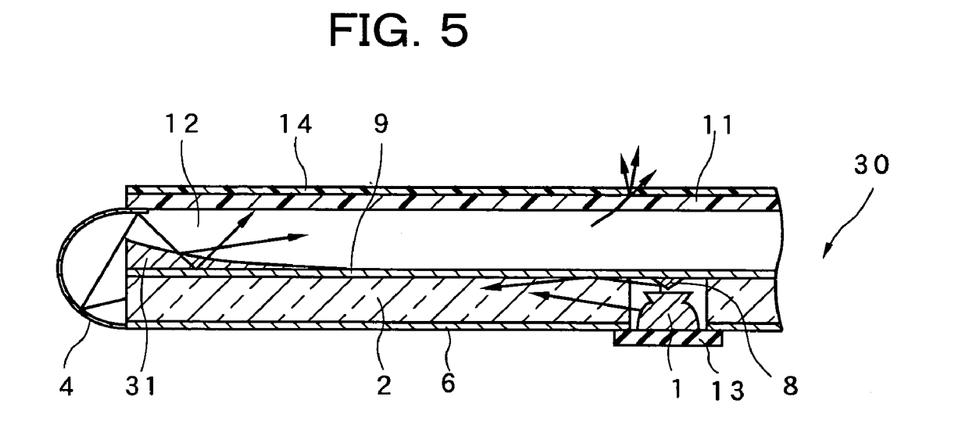
FIG. 5 is a cross-sectional diagram showing the structure of the backlight of the third embodiment of the present invention.

Described next is the backlight of the third embodiment of the present invention. FIG. 5 is a cross-sectional diagram showing the structure of the backlight of the present embodiment. In FIG. 5, the same reference numerals are assigned to the same constituent elements as those of the backlight 10 of the first embodiment shown in FIG. 2, and a detailed description thereof is omitted. The backlight 30 of the present embodiment is configured with a hollow-area reflective body 31 whereby light that has been reflected by the first and second reflectors 4 and 5 and whose direction has been changed 180° is directed to the center portion of the hollow area 12. The reflective body is disposed on both ends of the separation plate 9, as shown in FIG. 5. The hollow-area reflective body 31 has the shape of a triangular pillar, for example, and the lengthwise direction of the hollow-area reflective body is disposed so as to be parallel to the lengthwise direction of the first and second reflectors 4 and 5. The surface of the hollow-area reflective body 31 that faces the hollow area 12 is a curved mirror surface, for example.

In the backlight 30 of the present embodiment, the direction of travel of light emitted from the LEDs 1 and mixed by the first and second light guide plates 2 and 3 is changed 180° by the first and second reflectors 4 and 5, and the light is reflected by the curved portion of the hollow-area reflective body 31. The reflection angle in the hollow area 12, that is to say, the angle of incidence in the diffusion plate 11 is changed, and the light is thereafter directed into the center portion of the hollow area 12. Light can thereby uniformly spread in the hollow area 12 in comparison with the backlight 10 of the first embodiment, in which light is directed to the center area by the separation plate 9 alone without the use of a hollow-area reflective body 31. The configuration, operation, and effects other than those described above with reference to the backlight 30 of the present embodiment are the same as those of the backlight 10 of the first embodiment described above. In the backlight 30 of the present embodiment, the surface of the hollow-area reflective body 31 that faces the hollow area 12 is a curved mirror surface, but the present invention is not limited thereby, and it is also possible to use a flat surface; a stepped continuous surface that has wrinkles, crimps, or steps; or another surface with very small convexities and concavities.

Figure 6:
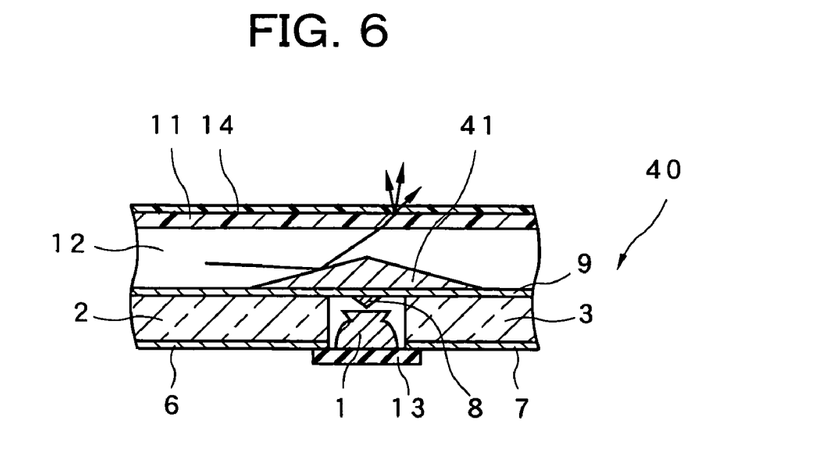
FIG. 6 is a cross-sectional diagram showing the structure of the backlight of the fourth embodiment of the present invention.

Described next is the backlight of the fourth embodiment of the present invention. FIG. 6 is a cross-sectional diagram showing the structure of the backlight of the present embodiment. In FIG. 6, the same reference numerals are assigned to the same constituent elements as those of the backlight 10 of the first embodiment shown in FIG. 2, and a detailed description thereof is omitted. The backlight 40 of the present embodiment is configured with a chevron projection (chevron reflective body 41) disposed in the center area of the separation plate 9. The projection uniformly spreads light that has arrived in the hollow area 12, as shown in FIG. 6. The chevron reflective body 41 changes the reflection angle of the light in the hollow area 12, and the shape of the chevron reflective body is a triangular pole or a semicircular pillar, for example. The surface facing the hollow area 12 is a mirror surface or a diffused reflective surface.

In the backlight 40 of the present embodiment, a chevron reflective body 41 is disposed in the center area on the separation plate 9. The light can therefore uniformly spread in the hollow area 12 because the reflection angle of the light in the hollow area 12, in other words, the incident angle to the diffusion plate 11, can be changed in the same manner as in the case in which the hollow-area reflective body 31 shown in FIG. 5 is provided. The configuration, operation, and effects other than those described above in the backlight 40 of the present embodiment are the same as those of the backlight 10 of the first embodiment described above. The backlight 40 of the present embodiment is configured with a chevron reflective body 41 in the center area of the separation plate 9 of the backlight 10 of the first embodiment, but the present invention is not limited by this configuration, and the backlights of the second and third embodiments described above can be applied. The case in which a chevron reflective body 41 is disposed in the center area of the separation plate 9 of these backlights also has the effect of allowing light to be uniformly spread in the hollow area 12 in the same manner as in the backlight 40 of the present embodiment.

Figure 7:
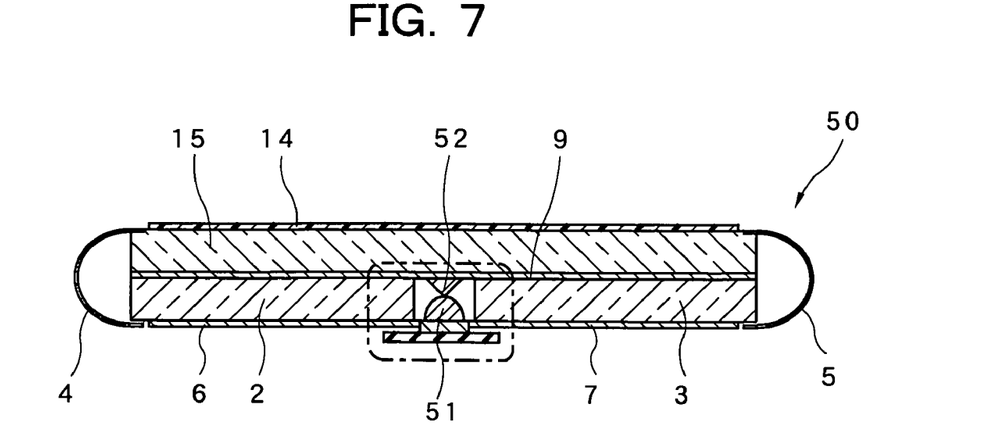
FIG. 7 is a cross-sectional view showing the structure of the backlight of the fifth embodiment of the present invention.

Described next is the backlight of the fifth embodiment of the present invention. FIG. 7 is a cross-sectional view showing the structure of the backlight of the present embodiment. In FIG. 7, the same reference numerals are assigned to the same constituent elements as those of the backlight 10 of the first embodiment shown in FIG. 2, and a detailed description thereof is omitted. The present embodiment is different from the first embodiment shown in FIG. 2 on the following points: the third light guide plate 15 is disposed in the hollow area 12, a plurality of LEDs 51 whose cross sections are semicircular are disposed in a single line in the lengthwise direction thereof as a light source, a first reflecting body 52 whose cross section is an inverted triangle is disposed above the LED 51, and a dispersion plate 11 is not provided. The upper surface of the light-emitting LED 51 is two-dimensionally curved (dome-shaped), and in the example shown in FIG. 7, the cross section has a semicircular shape. Such a plurality of LEDs 51 are aligned in a single row so that the medial axes of the curves (lengthwise direction) are matching. The LEDs 51 emit monochromatic RGB light, and an example of LEDs that may be used is Luxeon Emitter Lambertian manufactured by Lumileds. A rod-like first reflecting body 52 that extends in the lengthwise direction of the LED 51 is disposed above the LED 51, and the cross section of the first reflecting body 52 is an inverted triangle. A separation plate 9 is disposed between the third light guide plate 15, on the one hand, and the LED 51 and the first and second light guide plates 2 and 3, on the other hand; and the two groups of elements are optically separated.

The operation of the present embodiment is described next. A portion of the light emitted from the LEDs 51 directly enters the first and second light guide plates 2 and 3, and another portion enters the first and second light guide plates 2 and 3 after being reflected and redirected by the reflecting body 52. The light incident on the first and second light guide plates 2 and 3 reaches and leaves the excident end face of the first and second light guide plates 2 and 3 while repeatedly undergoing total reflection inside the first and second light guide plates 2 and 3. The light from the LEDs 51 undergoes mixing while propagating inside the first and second light guide plates 2 and 3. The direction of the light that has exited from the first and second light guide plates 2 and 3 is changed by about 180° by the first and second reflectors 4 and 5, and the light enters a third light guide plate 15. The light incident on the two end faces of the third light guide plate 15 uniformly exits from the upper surface of the third light guide plate 15 by way of the dispersion/reflection pattern disposed on the back surface (surface facing the separation plate 9) of the third light guide plate 15. A backlight light source can thereby be adapted to emit uniform planar light from the upper surface of the third light guide plate 15. In this case, uniform planar light can be obtained from the third light guide plate 15, even if a dispersion plate 11 is not provided, in the same manner as in the embodiment of FIG. 2.

Figure 8A:
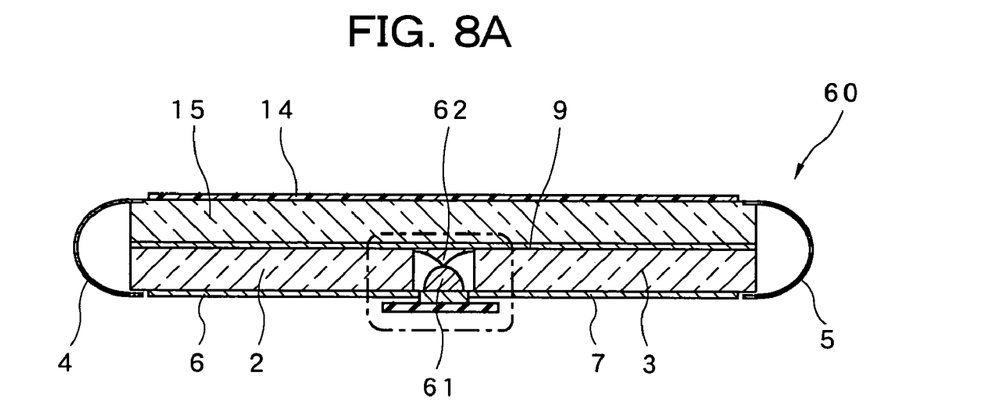
FIG. 8 is a cross-sectional view showing the structure of the backlight of the sixth embodiment of the present invention.
Figure 8B:
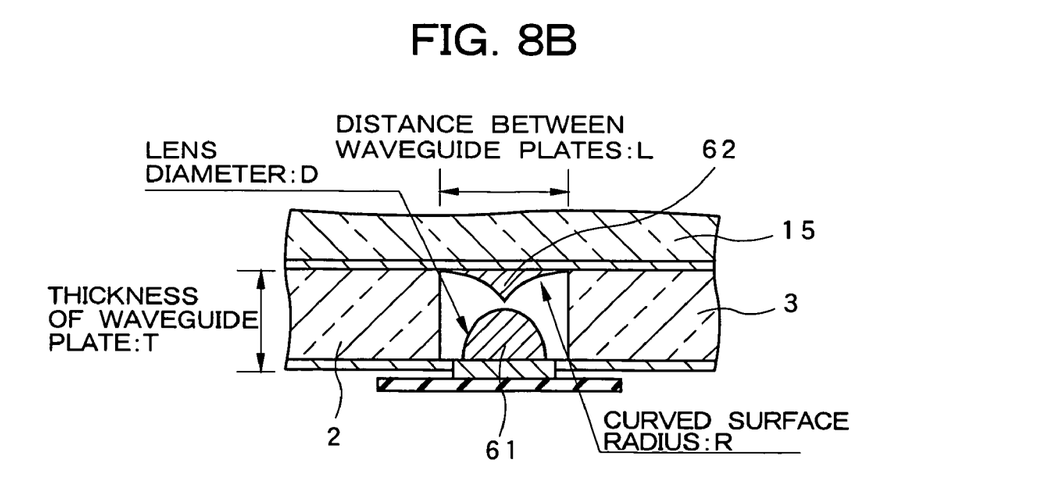

Described next is the backlight of the sixth embodiment of the present invention. FIGS. 8A and 8B are cross-sectional views showing the structure of the backlight 60 of the sixth embodiment of the present invention, wherein FIG. 8A is a view of the entire backlight, and FIG. 8B is a partial cross-sectional view of the vicinity of the light source. The present embodiment is different from the fifth embodiment shown in FIG. 7 in that the reflecting body 62 has a shape whose cross section is similar to an inverted triangle, and the two sloping surfaces are curved upward with a radius of curvature R. An LED 61 as a light source has a dome shape whose cross section is semicircular, in the same manner as the LED 51 of FIG. 7. The medial axes of the curves thereof are matched and a plurality of units are aligned in a single row. A first reflecting body 62 has a cross section in which the center potion projects toward the LED 61 (inverted triangular shape) and slopes from the center portion toward the two sides. The sloped surfaces are two-dimensionally curved so as to be upwardly convex. In the present embodiment, the curved surfaces are curved with a fixed radius of the curvature R, but the present invention in not limited thereby. A lens (prism) sheet or another optical sheet 14 is superimposed on the third light guide plate 15 in accordance with the desired characteristics. The emitted light can thereby be made more uniform, and the transmission angle can also be controlled or otherwise manipulated.

Figure 9A:
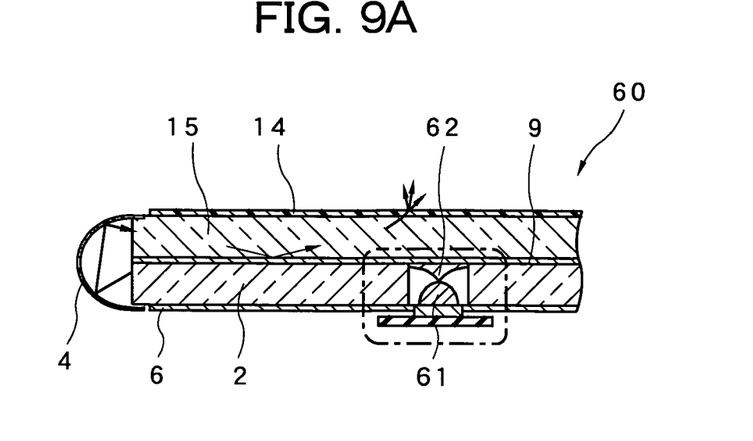
FIG. 9A is a view of the entire backlight.

The operation of the sixth embodiment is described next with reference to FIGS. 9A and 9B. In the LEDs 61 having a curved lens surface in the shape of a dome, the emitted light spreads substantially in a radial manner. In contrast, in the case that the reflective surface of the reflecting body 52 is a flat surface (triangular cross section) as in the fifth embodiment of FIG. 7 the reflected light directly enters the first and second light guide plates 2 and 3 as a radially spread beam. It is for this reason that loss occurs when light enters the first and second light guide plates 2 and 3, and the brightness of the backlight 50 is reduced.

Figure 9B:
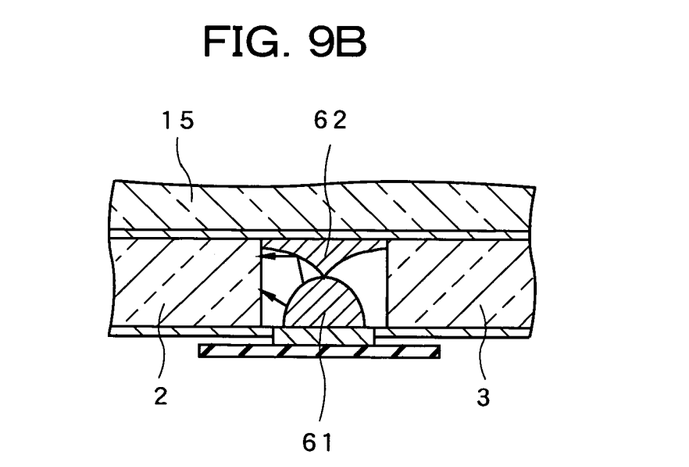
FIG. 9B is a partial enlarged cross-sectional view of the vicinity of the light source.

In contrast, in the sixth embodiment, the reflective surface of the first reflecting body 62 has a concave curved surface, as shown in FIG. 9B. Therefore, the light that has radially traveled from the LED 61 is reflected by the concave curved reflective surface of the first reflecting body 62 and is caused to converge. The light is then incident with high efficiency on the first and second light guide plates 2 and 3. In other words, the light is reflected by the reflecting body 62, and the amount of light that does not enter the first and second light guide plates 2 and 3 is significantly reduced. The light is incident on the first and second light guide plates 2 and 3 substantially perpendicular to the end faces of the first and second light guide plates 2 and 3. For this reason, a high-intensity backlight can be obtained by the present embodiment. As a result of the improved light efficiency, a lower amount of power is required in order to obtain the same optical characteristics when the same number of LEDs is used. Alternatively, the number of LEDs that are used can be reduced and manufacturing costs can thereby be curtailed when the same optical characteristics are obtained.

It is preferable that R/D be 1 to 2, and the thickness T be D−2 mm or greater and D+2 mm or less, where R is the radius of curvature of the sloped reflective surface of the first reflecting body 62, D is the diameter of the curved lens surface of the LED 61, and T is the thickness of the first and second light guide plates 2 and 3, as shown in FIG. 8B.

EXAMPLES

Figure 10:
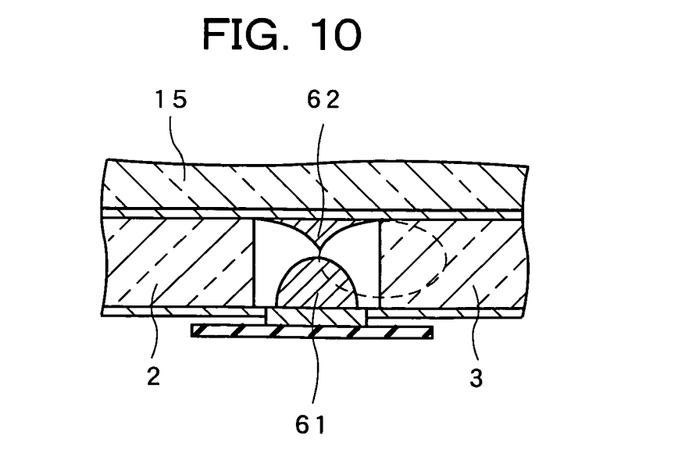
FIG. 10 is a cross-sectional view showing a modified example of the case in which the shape of the curved surface of the reflective surface of the first reflective body is elliptical.

The lens diameter D, light guide plate thickness T, distance between light guide plates L, curved surface radius R, R/D, D−2, and D+2 were set as shown in Table 1 in the backlight 60 of the sixth embodiment, and a simulated calculation was carried out. TABLE 2 shows the results of verifying by simulation the ratio of the luminous flux emitted from the reflector-side end face of the first and second light guide plates 2 and 3, and the ratio of the luminous flux incident on the reflector-side end face of the third light guide plate 15, per meter of the total luminous flux emitted from all the LEDs at the stated parameters. However, in the backlight of reference example 2, the cross-sectional shape of the reflective surface has a triangular shape in which the apex is down and the bottom side is up. The length of the two sides from the apex of the triangle is 3 mm. Other constituent elements are the same as the sixth embodiment described above. Also, the examples are configured so that R/D is 1 to 2, and the thickness T is D−2 mm or greater and D+2 mm or less. Cases that deviate from these numerical ranges are used as reference examples.

of FIG. 10, the preferred numerical ranges described above are set so that the radius of curvature R is the sum of the elliptical major and minor axis lengths divided by 4. In the case of FIG. 11, the radius of curvature R is the radius of the approximate circle or the sum of the major and minor axis lengths of the ellipsis divided by 4.

Figure 12:
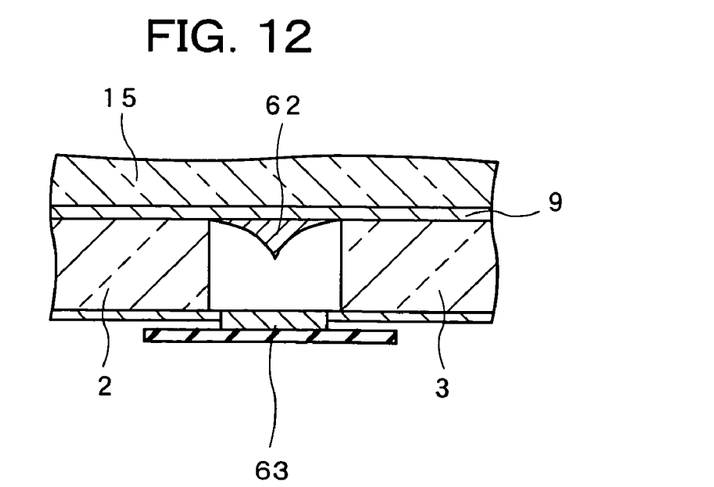
FIG. 12 is a cross-sectional view showing a modified example of the case in which the LED 63 has no lens.

In the fifth and sixth embodiments described above, the LEDs 51 and 61 provided with domed lens are used, but the present invention in not limited by this option alone. It is also possible to use an LED 63 without a lens as shown in FIG. 12, or a side light-emitting LED 1 that exhibits maximum luminous intensity in a direction substantially parallel to the surface of the substrate 13, as shown in the first, third and fourth embodiment.

Figure 13:
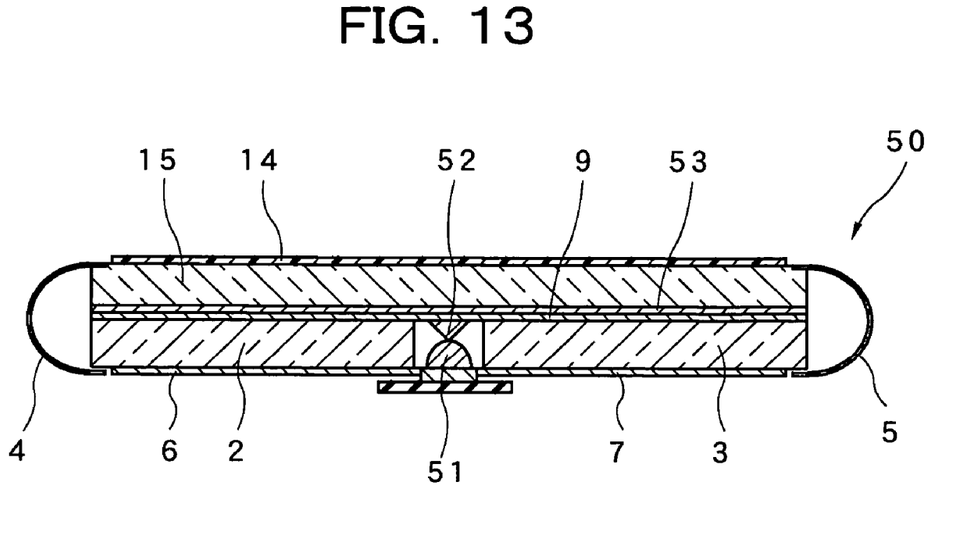
FIG. 13 is a cross-sectional view showing a modified example of the backlight of the fifth embodiment of the present invention shown in FIG. 7.

As shown in FIG. 13, a scattering and reflecting member 53 can be provided at the surface of the third light guide plate 15 on the side of the separation plate 9. In this case, light entered the third light guide plate 15 is reflected at the scattering and reflecting member 53 and is emitted from the surface of the third light guide plate 15 that is on the opposite side from the separation plate 9.

In the embodiments shown in FIGS. 7 and 8A and 8B, a hollow interior 12 shown in FIGS. 2 to 6 may be disposed above the first and second light guide plates 2, 3 and the light source (LED 51, 61) instead of the third light guide plate 15. Also, a diffusion plate 11 and an optical sheet 14 may be provided above the hollow interior 12, as shown in FIGS. 2 to 6. Further, a hollow-area reflective body 31 and a chevron reflective body 41 may be provided in the hollow interior 12, as shown in FIGS. 5 and 6.

The backlight of the first to sixth embodiments described above may, for example, be used for advertising panels and various other displays, in liquid crystal display devices and other display devices, and in general lighting devices and the like. Also, a metal or resin frame, chassis, and other structural member is required in order to hold the aforementioned light guide plates, light sources, and other components in an actual product and to form a backlight or a liquid crystal display apparatus, but such members are not required in the description of the present invention, and their illustrations and descriptions are therefore omitted.

Described next is a liquid crystal display device of the embodiment of the present invention. The liquid crystal display device of the present embodiment is provided with a backlight that is disposed behind the liquid crystal panel to which image signals are input from the exterior to form images and that provides light to the liquid crystal panel. The backlights described above in the first to sixth embodiments can be used in the liquid crystal display device. A high-quality

TABLE 1

| | | PARAMETERS | | | | | |
|---|---|---|---|---|---|---|---|
| No. | | LENS DIAMETER D(mm) | THICKNESS OF LIGHT GUIDE PLATE T(mm) | DISTANCE BETWEEN LIGHT GUIDE PLATES L(mm) | CURVED SURFACE RADIUS R(mm) | R/D | D − 2 | D + 2 |
| EXAMPLE | 1 | 5.8 | 6 | 10 | 7 | 1.2 | 3.8 | 7.8 |
| | 2 | 5.8 | 6 | 12 | 9 | 1.6 | 3.8 | 7.8 |
| REFERENCE EXAMPLE | 1 | 5.8 | 8 | 10 | 7 | 1.2 | 3.8 | 7.8 |
| | 2 | 5.8 | 6 | 10 | — | — | 3.8 | 7.8 |

TABLE 2

| | | SIMULATION RESULTS | |
|---|---|---|---|
| No. | | FIRST AND SECOND LIGHT GUIDE PLATES EMISSION EFFICIENCY (%) | THIRD LIGHT GUIDE PLATE INCIDENCE EFFICIENCY (%) |
| EXAMPLE | 1 | 83.4 | 73.0 |
| | 2 | 83.1 | 72.9 |
| REFERENCE EXAMPLE | 1 | 62.1 | 53.9 |
| | 2 | 77.0 | 67.0 |

The simulation results of the backlight of the first and second examples of the present invention show that both the light guide plate emission efficiency and the light guide plate incidence efficiency are high. In contrast, in reference example 1, the thickness T of the light guide plates does not fall within the range D−2 to D+2 mm, and the light efficiency is poor. In reference example 2, the cross-sectional shape of the reflective body is triangular (FIG. 7) in which the apex is down and the bottom side is up, and the light guide plate emission efficiency and the light guide plate incidence efficiency are lower than examples 1 and 2 but higher than reference example 1.

Figure 11A:
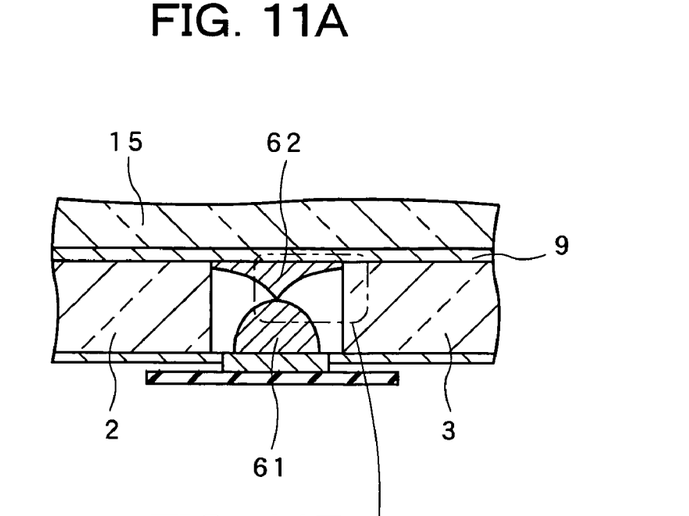
FIG. 11 is a cross-sectional view showing a modified example of the case in which the shape of the curved surface of the reflective surface of the first reflective body is composed of a plurality of flat surfaces.
Figure 11B:
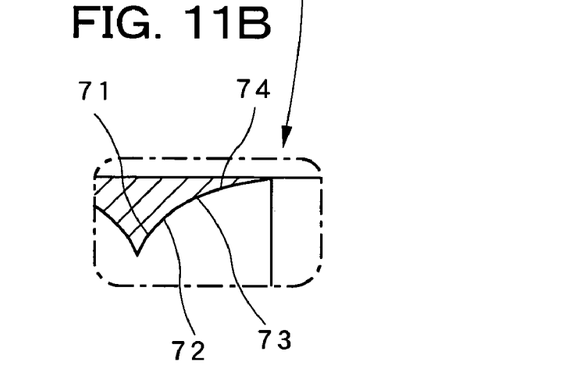

In the backlight 60 of the present embodiment, the reflective surface of the reflecting body 62 that is curved at a constant radius of curvature R, but the present invention is not limited thereby, and the curvature of the reflective surface of the reflecting body 62 may be elliptical, as shown in FIG. 10. Alternatively, the surface may be configured with a plurality of sequentially arranged flat mirrors (A) 71, (B) 72, (C) 73, and (D) 74 disposed so as to form a concave surface that is upwardly convex, as shown in FIGS. 11A and 11B. In the case image can thereby be displayed because uniform light can be supplied to the liquid crystal panel without nonuniformity of brightness and color.

What is claimed is:

1. A backlight, comprising:
   first and second light guide plates disposed so that end faces thereof face each other and are spaced apart from each other;
   a light source disposed between the mutually opposing end faces of said first and second light guide plates;
   a hollow propagation region disposed above said first and second light guide plates and said light source; and
   a reflecting body between the hollow propagation region and said light source and having an axis of symmetry vertically aligned between said hollow propagation region and said light source,
   wherein said hollow propagation region propagates light emitted from said light source through said first light guide plate and light emitted from said light source through said second light guide plate.

2. A backlight, comprising:
   first and second light guide plates disposed so that the end faces thereof face each other having an interval;
   a light source disposed between the mutually opposing end faces of said first and second light guide plates;
   a diffusion plate disposed above said first and second light guide plates and said light source;
   a hollow area formed between said first and second light guide plates and said diffusion plate;
   further comprising a second reflecting member formed on said separation plate for changing an angle of light entered to said hollow area;
   first and second reflectors for introducing light propagated from said light source through said first light guide plate and light propagated from said light source through said second light guide plate to said hollow area,
   wherein light entered to said hollow area is reflected at the interface between said hollow area and said first and second light guides and is emitted through said diffusion plate.

3. A backlight according to claim 2, further comprising:
   a separation plate disposed so as to cover the upper surface of said first and second light guide plates and the gap between said first and second light guide plates, and optically separates said hollow area and said first and second light guide plates.

4. The backlight according to claim 3, wherein said light source includes one or plurality of light-emitting diodes.

5. The backlight according to claim 3, wherein said light source has a first light source for emitting red light, a second light source for emitting green light, and a third light source for emitting blue light.

6. The backlight according to claim 3, wherein the upper surface of said light-emitting light source has two-dimensionally curved surface.

7. The backlight according to claim 3, further comprising a first reflecting member disposed above said light source and reflecting light emitted from said light source toward said first light guide plate or said second light guide plate.

8. The backlight according to claim 7, wherein
   said first reflecting member has a cross section whose center portion projects toward said light source and has two sloping surfaces from the center portion toward the two side portions;
   the two sloping surfaces are two-dimensionally curved so as to be upwardly convex; and
   said sloping surfaces are concave.

9. The backlight according to claim 8, wherein
   R/D is 1 to 2; and
   the thickness T is D−2 mm or greater and D+2 mm or less, where R is the radius of curvature of the sloping surface of said first reflecting member, D is the diameter of the curved surface of the upper surface of said light source, and T is the thickness of said first and second light guide plates.

10. The backlight according to claim 3, further comprising a second reflecting member formed on said separation plate for changing an angle of light entered to said hollow area.

11. A liquid crystal display device, comprising:
    a liquid crystal panel; and
    a backlight disposed behind said liquid crystal panel and supplying light to the liquid crystal panel, wherein said backlight is the backlight according to claim 3.

12. A backlight, comprising:
    first and second light guide plates disposed so that the end faces thereof face each other having an interval;
    a light source disposed between the mutually opposing end faces of said first and second light guide plates;
    further comprising a first reflecting member disposed above said light source and reflecting light emitted from said light source toward said first light guide plate or said second light guide plate;
    a third light guide plate disposed above said first and second light guide plates and said light source;
    a continuous separation plate disposed between and in contact with said first and second light guide plates and said third light guide plate to separate optically said first and second light guide plates and said third light guide plate; and
    first and second reflectors for introducing light propagated from said light source through said first light guide plate and light propagated from said light source through said second light guide plate to said third light guide plate,
    wherein light entered to said third light guide plate is reflected at the upper surface of said separation plate and is emitted from the surface of said third light guide plate that is on the opposite side from said separation plate.

13. The backlight according to claim 12, further comprising: a scattering and reflecting member provided at the surface of the third light guide plate on the separation plate side, wherein light entered said third light guide plate is reflected at the scattering and reflecting member and is emitted from the surface of the third light guide plate that is on the opposite side from the separation plate.

14. The backlight according to claim 12, wherein said light source includes one or plurality of light-emitting diodes.

15. The backlight according to claim 12, wherein said light source has a first light source for emitting red light, a second light source for emitting green light, and a third light source for emitting blue light.

16. The backlight according to claim 12, wherein said light-emitting light source has two-dimensionally curved surface.

17. The backlight according to claim 1, wherein
    said first reflecting member has a cross section whose center portion projects toward said light source and has two sloping surfaces from the center portion toward the two side portions;
    the two sloping surfaces are two-dimensionally curved so as to be upwardly convex; and
    said sloping surfaces are concave.

18. The backlight according to claim 17, wherein
R/D is 1 to 2; and
the thickness T is D−2 mm or greater and D+2 mm or less, where R is the radius of curvature of the sloping surface of said first reflecting member, D is the diameter of the curved surface of the upper surface of said light source, and T is the thickness of said first and second light guide plates.

19. A liquid crystal display device, comprising:
a liquid crystal panel; and
a backlight disposed behind said liquid crystal panel and supplying light to the liquid crystal panel,
wherein said backlight is the backlight according to claim 12.

* * * * *